US011893851B2

(12) United States Patent
Rodriguez et al.

(10) Patent No.: US 11,893,851 B2
(45) Date of Patent: Feb. 6, 2024

(54) MODULAR BUTTONS FOR A GAMING SYSTEM

(71) Applicant: Aristocrat Technologies, Inc. (ATI), Las Vegas, NV (US)

(72) Inventors: Frank Rodriguez, Las Vegas, NV (US); Stephen Shaffer, Jr., Las Vegas, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 21 days.

(21) Appl. No.: 17/695,308

(22) Filed: Mar. 15, 2022

(65) Prior Publication Data

US 2022/0301384 A1 Sep. 22, 2022

Related U.S. Application Data

(60) Provisional application No. 63/163,329, filed on Mar. 19, 2021.

(51) Int. Cl.
*G07F 17/32* (2006.01)

(52) U.S. Cl.
CPC ...... *G07F 17/3209* (2013.01); *G07F 17/3211* (2013.01); *G07F 17/3223* (2013.01)

(58) Field of Classification Search
CPC ............. G07F 17/3209; G07F 17/3211; G07F 17/3223
See application file for complete search history.

(56) References Cited

U.S. PATENT DOCUMENTS

| | | | | |
|---|---|---|---|---|
| 2007/0060352 A1* | 3/2007 | Cole | G07F 17/32 | 463/37 |
| 2008/0113715 A1* | 5/2008 | Beadell | G07F 17/3216 | 463/17 |
| 2009/0098938 A1* | 4/2009 | Anderson | G07F 17/3211 | 463/16 |
| 2012/0268035 A1* | 10/2012 | Stanley | H05B 47/185 | 315/307 |
| 2014/0274372 A1* | 9/2014 | Rosander | G07F 17/3209 | 463/31 |
| 2015/0228139 A1* | 8/2015 | Geerlings | G07C 9/00309 | 340/5.61 |

FOREIGN PATENT DOCUMENTS

WO WO-2020081943 A1 * 4/2020 ............. A63F 13/22

* cited by examiner

*Primary Examiner* — Werner G Garner
(74) *Attorney, Agent, or Firm* — McAndrews, Held & Malloy, Ltd.

(57) ABSTRACT

Disclosed are gaming systems, methods and machines that include one or more modular buttons. In particular, a modular button is configured for mounting within a frame or panel. The modular button may be interchangeable, such that various modular buttons may be added, exchanged, and/or removed from the frame. In some examples, the frame may be formed of a metal or other structural material. In some examples, the frame may be formed within a surface of another system, such as a bar-top, a gaming table, or an EGM, as a non-limiting listing of examples. The modular buttons include devices and/or circuitry to enable wireless transfer of power and/or communications.

19 Claims, 9 Drawing Sheets

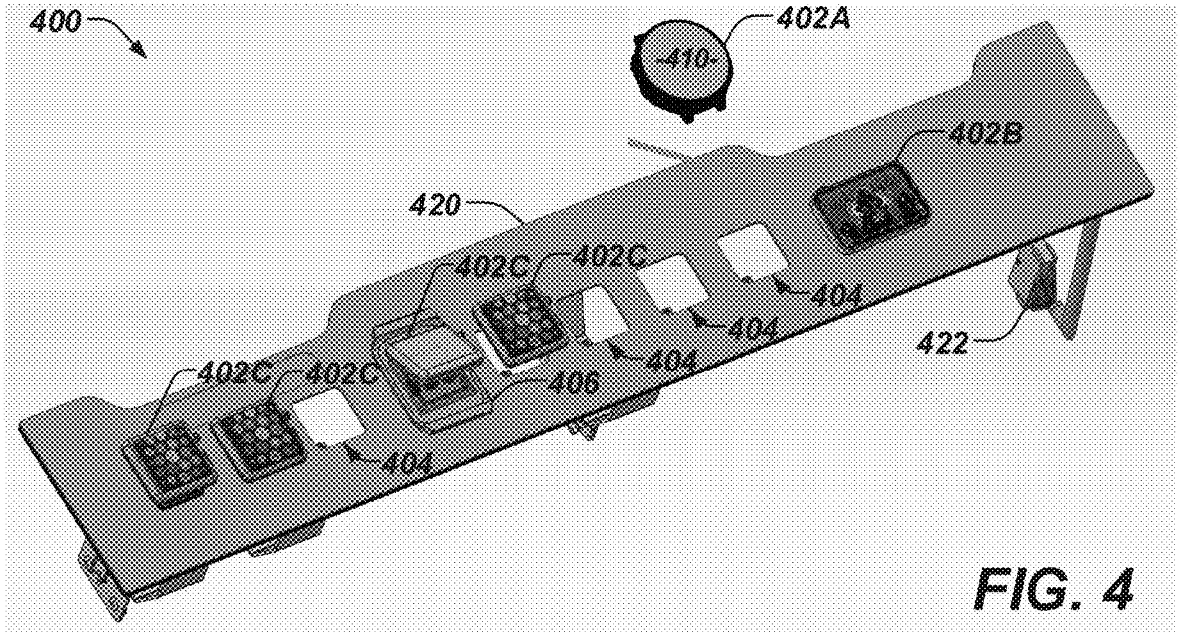
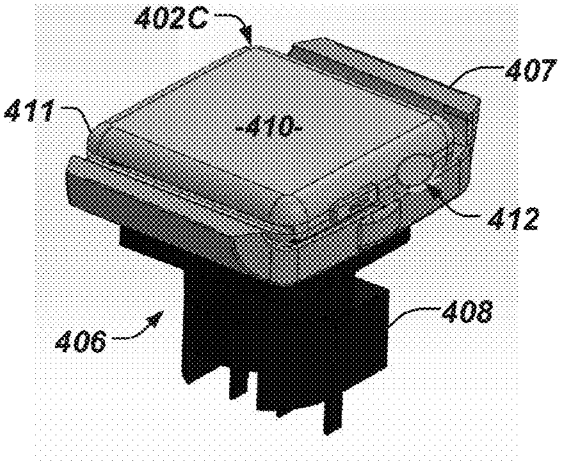
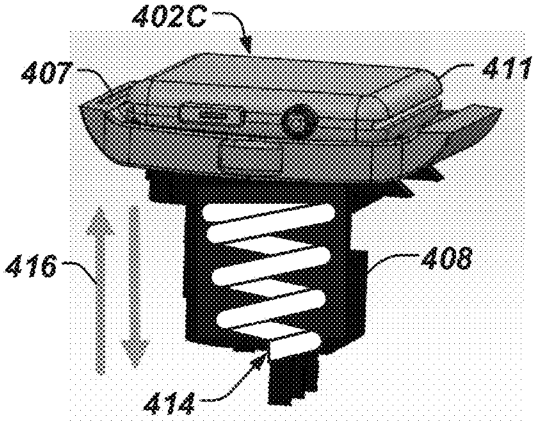
FIG. 5A
FIG. 5B

MODULAR BUTTONS FOR A GAMING SYSTEM

CROSS-REFERENCE TO RELATED APPLICATIONS

This application hereby claims priority to and the benefit of U.S. Provisional Application Ser. No. 63/163,329, entitled "MODULAR BUTTONS FOR A MULTI-BUTTON DECK," filed Mar. 19, 2021. U.S. Provisional Application Ser. No. 63/163,329 is hereby incorporated by reference in its entireties for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

This disclosure relates generally to modular buttons for gaming systems, methods of servicing modular buttons, and machines employing modular buttons. In particular, the gaming systems, methods and machines may include one or more of the modular buttons, and/or a button deck with one or more modular buttons being mounted to a surface or structure within a gaming environment, such as a bar-top, a gaming table, and/or a gaming cabinet.

BRIEF DESCRIPTION OF THE DRAWINGS

FIG. 4 illustrates an example button deck according to some aspects of the present disclosure.

FIGS. 5A to 5D illustrate example modular buttons according to some aspects of the present disclosure.

DETAILED DESCRIPTION

Figure 1:
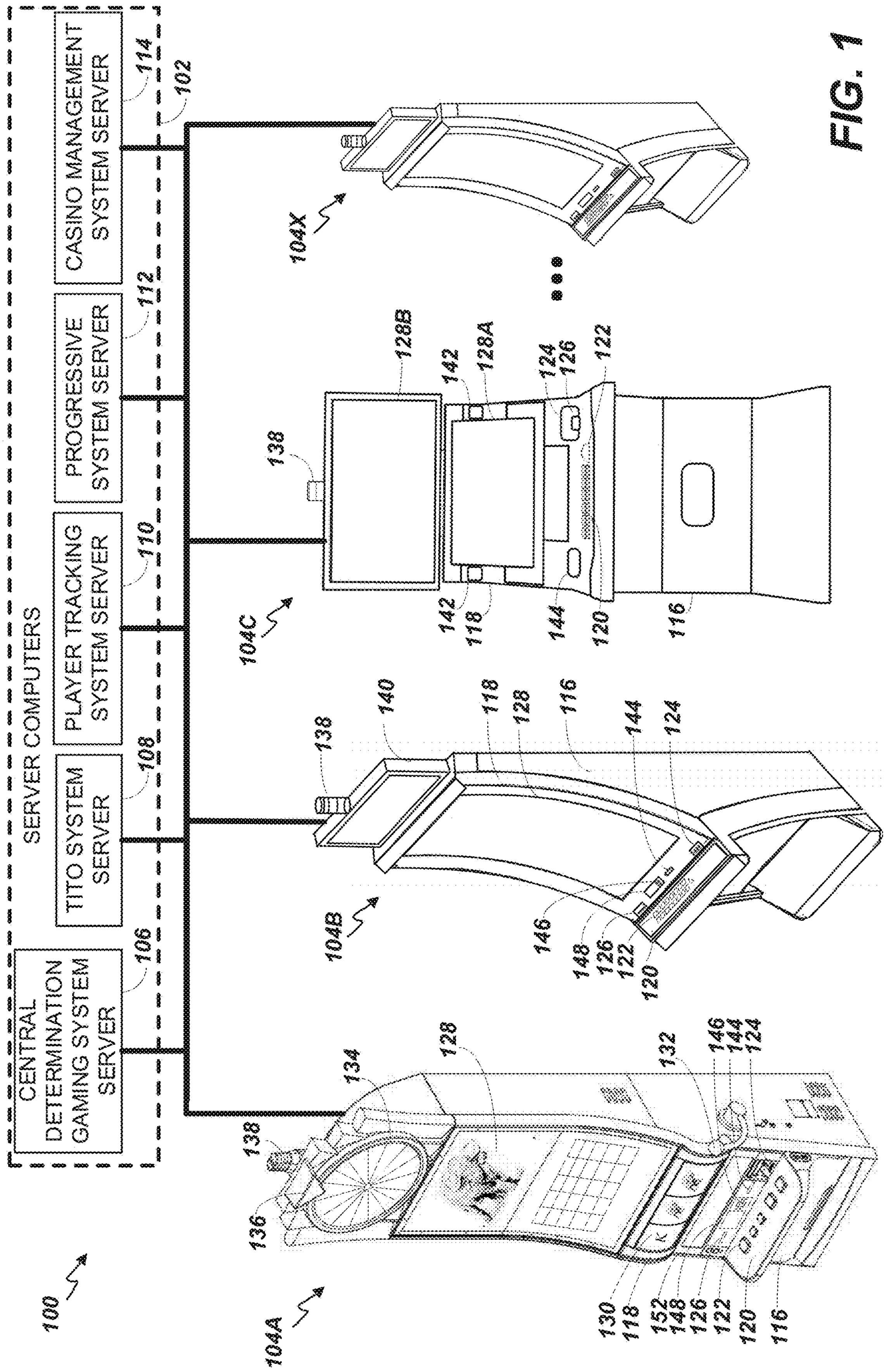
FIG. 1 is an exemplary diagram showing several EGMs networked with various gaming related servers.

Disclosed are systems and methods for a gaming systems, methods and machines that include one or more modular buttons. In particular, the modular buttons and/or interfaces may be incorporated in a button deck mounted to a surface or structure within a gaming environment, such as a bar-top, a gaming table, and/or a gaming cabinet.

In disclosed examples, a modular button is configured for mounting within a frame or panel. The modular button may be interchangeable, such that various modular buttons may be added, exchanged, and/or removed from the frame. In some examples, the frame may be formed of a metal or other structural material. In some examples, the frame may be formed within a surface of another system, such as a bar-top, a gaming table, or an EGM, as a non-limiting listing of examples.

In conventional button decks (e.g., a surface mounted physical button and/or a Virtual Button Deck (VBD)), all or a substantial part of the button deck is removed in order to repair or replace a single button on the button deck. Other issues exist with button deck maintenance, including taking associated systems, hardware, games, and/or power connections offline in order to remove a button and/or associated button deck. Further, each button requires physical connection for power and communication, limiting placement options for buttons, button decks, and therefore, gaming opportunities.

By contrast, disclosed example modular buttons include a player interface(s) or top portion with a dynamic display (such as a touchscreen liquid crystal display (LCD) type) in various configurations (e.g., square, rectangular, round, etc.) that attaches to a common base (e.g., secured to the frame). Employing modular buttons and/or a common base allows for the player interface portion to be quickly removed from the frame and/or replaced without removal of the entire button deck. Additionally or alternatively, disclosed example modular buttons may include devices and/or circuitry to enable wireless transfer of power and/or communications.

In some additional or alternative examples, an interactive surface display may be employed in a manner similar to the disclosed modular button. For example, the interactive surface display may include an interactive screen, such as a LCD, providing an appearance of a "floating" button deck, the screen being configured for placement in a frame. Additionally or alternatively, disclosed example interactive surface displays may include devices and/or circuitry to enable wireless transfer of power and/or communications.

Advantageously, in some examples, a modular button may be embedded into a display of a gaming machine itself to provide flexibility in utilizing other areas of the EGM, opening possibilities for new and innovative cabinet designs. Furthermore, the disclosed modular buttons and/or a floating button deck provide for a configurable yet durable and waterproof button deck surface. Additionally, a floating LCD and/or button within the button deck will attract new players because of the attractive appearance and uniqueness of the design. Further advantages include simplicity of design and assembly, enhanced serviceability, and simple and efficient button replacement with the capability to change a button style, all of which reduces cost of production and/or maintenance of a button deck.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
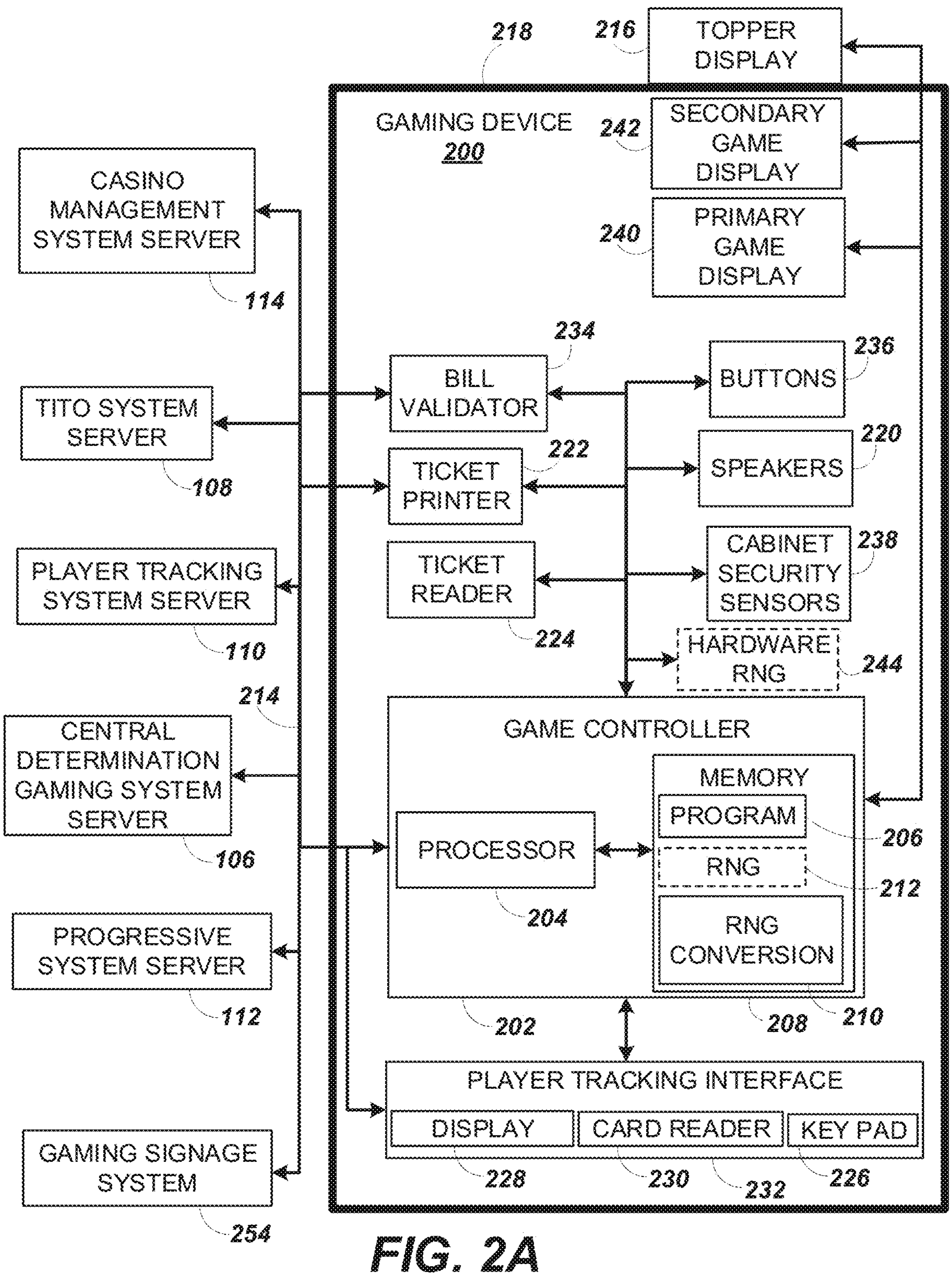
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
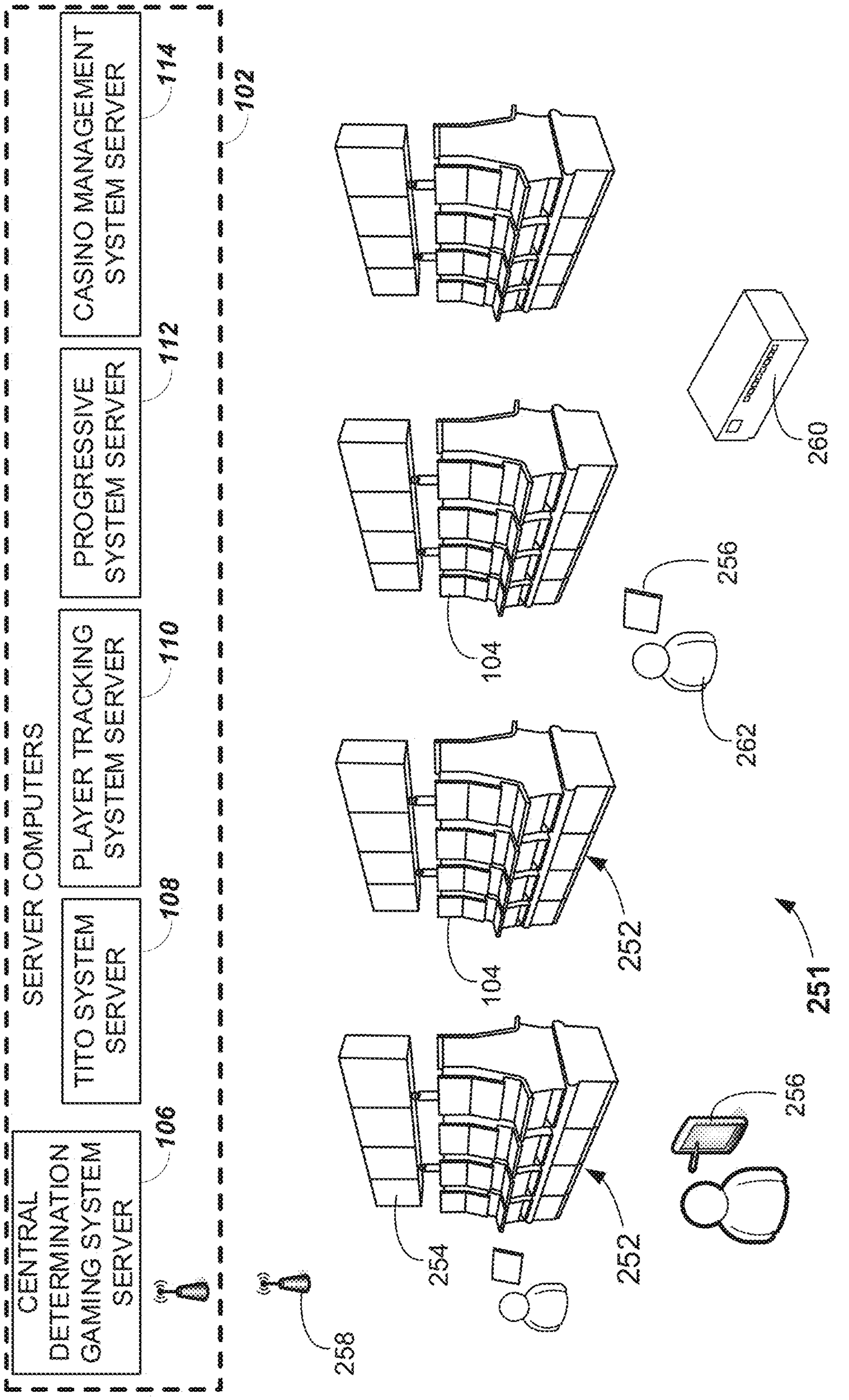
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
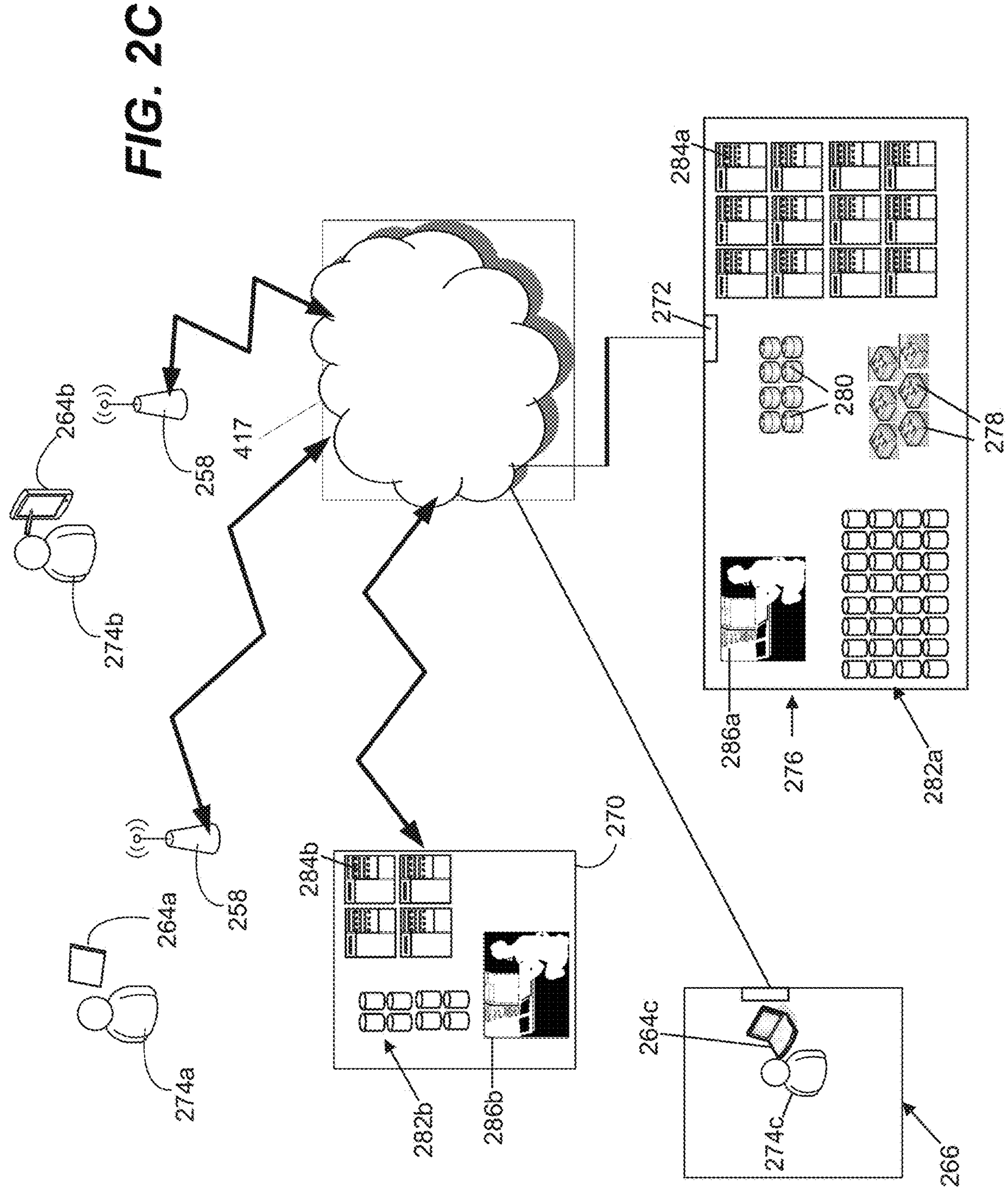
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
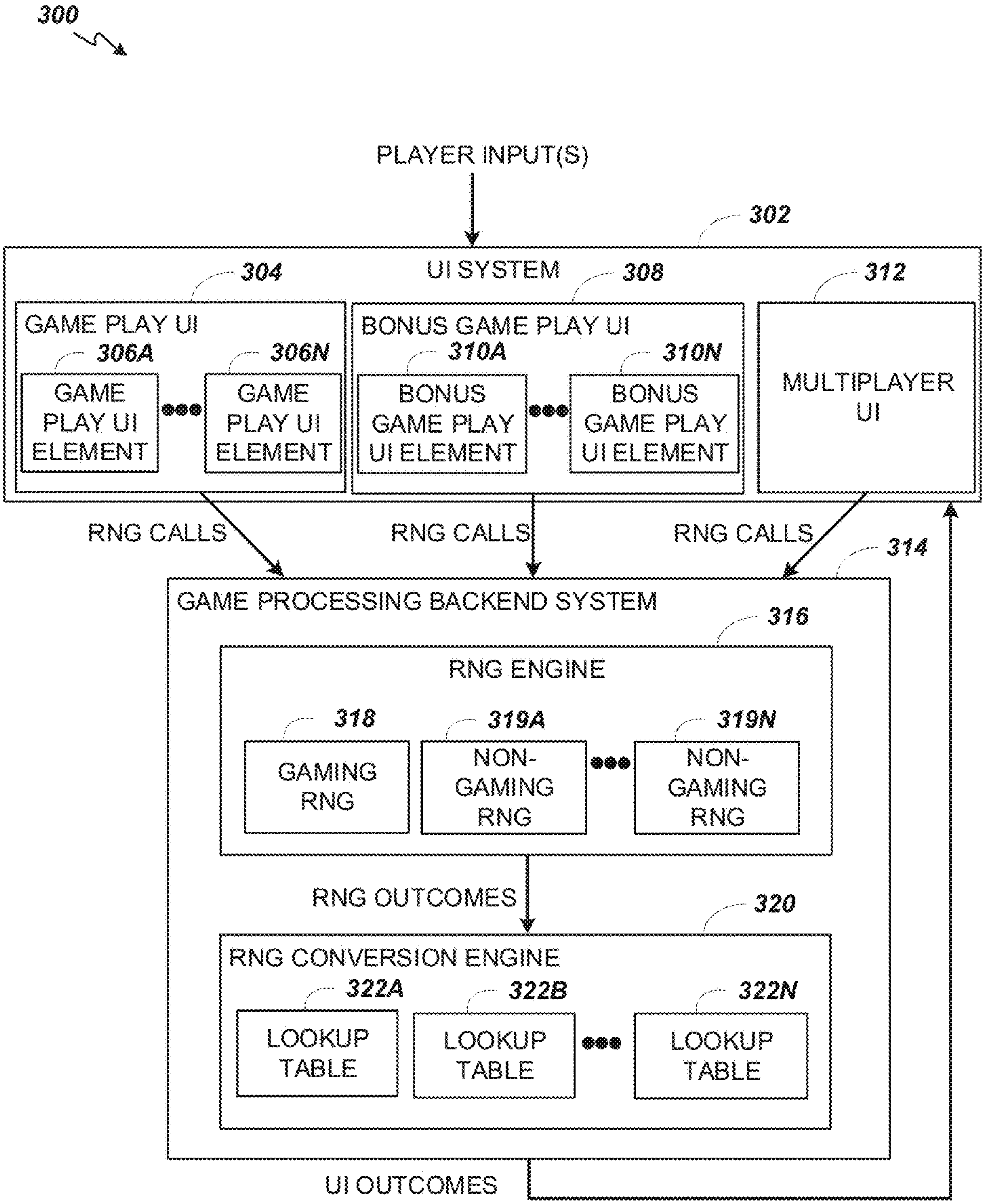
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIG. 4 illustrates an example button deck 400. As shown in FIG. 4, the button deck 400 includes one or more modular buttons 402A, 402B and 402C, each configured for mounting within or to a frame or panel 420. In some examples, the modular buttons may be removably secured directly to the frame 420 in an opening 404. In some examples, a base 406 may be configured for mounting within or to the opening 404, with the base 406 further configured to removably secure one or more of the modular buttons 402A, 402B and 402C. In other words, the modular buttons 402A, 402B and 402C are interchangeable with bases 406 contained within the frame 420 support for having the base 406 integrated as part of the frame (e.g., the base being molded into the frame itself as if it were a one-piece plastic part), such that various modular buttons may be added, exchanged, and/or removed from the frame 420 (e.g., for maintenance and/or for a particular application). The modular buttons 402A, 402B and 402C may be interchangeable with bases 406 when they are positioned away from the frame 420. In some examples, each modular buttons 402A, 402B and 402C represents a different type of button, with a different geometry (e.g., round, rectangular, and square respectively) and/or different functionality (e.g., capability for a touchscreen, communication type, camera enabled, etc.).

In some examples, the frame 420 may be formed of a metal or other structural material. In some examples, the frame 420 may be formed within or as a part of a surface of another system, such as a bar top, a gaming table, or an EGM, as a non-limiting listing of examples. In some example, openings 404 may be cut into a panel or other surface of an existing structure (e.g., an EGM, bar top, wall, etc.) for mounting modular buttons as disclosed herein, without the use of a frame.

In some examples, the modular buttons 402A, 402B and 402C within the button deck 400 include separate screens 410 and are configured to operate independently. For instance, display screens of adjacent modular buttons may be controlled independently and/or display content unique to the respective modular button. In some examples, the modular buttons 402A, 402B and 402C are in communication with one another and/or a remote controller (e.g., game controller 202) in order to coordinate operation of two or more buttons. When display of content is coordinated, a variety of animations may be provided, and/or a larger image presented, to indicate an event during gameplay. For example, a user input at one or more of the modular buttons 402A, 402B and 402C may trigger an outcome represented by changes in a display(s) on the one or more modular buttons 402A, 402B, 402C. The different images can be controlled to exhibit dynamic images or animations (e.g., changes in intensity, color, speed, selective illumination, pulsing, etc.), such as in response to the trigger, which may correspond to a specific event associated with gameplay (e.g., a large wager, a jackpot award, etc.). One or more images can be incorporated (e.g., between two, three, four, or more modular buttons and/or an interactive surface display).

Additionally or alternatively, systems and/or circuitry 422 are included to provide power, control, and/or transmit information to the modular buttons. Circuitry 422 may be housed within or to the frame 420, linked to other computing platforms, such as an external system, remote server, remote control (e.g., to provide instructions, content, etc.) and/or remote displays (e.g., to provide information to the player and/or respond to player commands).

In disclosed examples, the modular buttons 402A, 402B and 402C are configured as a touch screen to receive commands and/or change a displayed image on the modular button display in response to player inputs. For example, a bar-top poker card game may employ multiple modular buttons to reveal the player's hand and be operable to change or exchange a displayed card based on a player input. In some embodiments, the touch screen may permit interactive actions by players, such as selecting or moving symbols, cards or other displayed elements on the touch screen. In some examples, an order, timing, or synchronization of the changing images and/or lighting effects are predetermined, whereas in other examples the rules governing such changes are randomly selected (such as via a RNG call). For example, the controller (e.g., via game controller 202) can control one or more displays to activate a random number generator call in response to the trigger event, to select a change (e.g., a selection of cards, one or more predetermined sequences) from a list of available options and/or sequences based on one or more characteristics of the trigger event (e.g., corresponding to a player selection, a jackpot award, etc.), and control the one or more displays to present one or more changes in accordance with the trigger event.

Each modular button may operate individually and/or may operate in concert with one or more other modular buttons. A central controller (e.g., control processor 202) may be configured to communicate with one or more modular buttons (e.g., wirelessly), and/or coordinate presented images, timing of certain actions (e.g., activate and/or deactivate in response to a player action, timing, etc.). In some examples, near or adjacent modular buttons may be controlled together to provide entertainment and/or gaming opportunities to a player. In this manner, the modular buttons may present varying options for gameplay and/or present common animations or graphics across multiple modular buttons.

As illustrated in FIGS. 5A and 5B, the modular button 402C may operate as part of a two-piece push button switch. For example, the modular button 402C represents a first portion including touch enabled display screen 410 and a second base or casing portion 411, which is configured for insertion into the common base 406. In some examples, the common base 406 includes one or more of a cradle 407 and/or a base portion or connector 408. The modular button 402C may additionally or alternatively include another user interface 412 (e.g., a button, dial, etc.), as well as processing circuitry, communications circuitry, energy storage devices and/or energy receiving circuits. The cradle 407 and/or the connector 408 may include a fastener or other mounting mechanism to secure the common base 406 to a frame and/or other structure (e.g., frame 420 shown in FIG. 4). In some examples, the base portion or connector 408 includes one or more response features 414 (e.g., a spring) to move part or all of the modular button (e.g., in direction 416) in response to a player action, such as vibrate, depress, extend, or rotate, as a list of non-limiting examples. In some examples, the response feature 414 is an electromechanical actuator and/or mechanical valve that responds to player movement and/or gameplay to provide a tactile response and/or positional changes of the modular button(s). The response feature 414 (e.g., actuator) may include circuitry to receive control signals from a central controller (e.g., control processor 202), as well as energy storage device, both of which may be maintained wirelessly or via wired connections.

The base 406 may be permanently or semi-permanently fixed to the frame 420, such that removal of modular button 402C is performed without requiring removal or modification of the base 406. Further, regardless of the use or non-use of base 406, the modular button 402C is operable to receive power and/or communications wirelessly and/or via wired connections, as disclosed herein.

In disclosed examples, the modular button 402C and the common base 406 are separable. A fastener or other mounting mechanism (e.g., a snap-fit connection, a magnetic connection, a non-permanent adhesive, hook and loop fastener, etc.) is used to secure the modular button 402C to the common base 406, as provided in greater detail with respect to FIGS. 5C and 5D. Similar or alternative mounting mechanisms may also be used to secure the common base 406 to the frame 420. In some examples, components of the common base 406, such as the cradle 407 and/or connector 408, are configured to be secured within the frame 420, or other suitable housing. The modular button 402C is removable, further allowing for the cradle 407 to be removed and/or replaced without removal of the connector 408, the frame 420, and/or any other modular button.

In a disclosed example, one or more modular buttons are integrated in a frame and/or panel embedded in a bar top or other structural fixture. Although the connector 408 may be operable to receive a wired connection (e.g., for provision of power and/or communications), the disclosed modular buttons provide the functional purpose of the modular button (e.g., receiving player inputs, providing information, alerts, responding to elements of gameplay, etc.) without requiring multiple physical connections (e.g., a wired power and/or communications) and/or providing individually removable buttons in a multiple button deck.

Figure 5C:
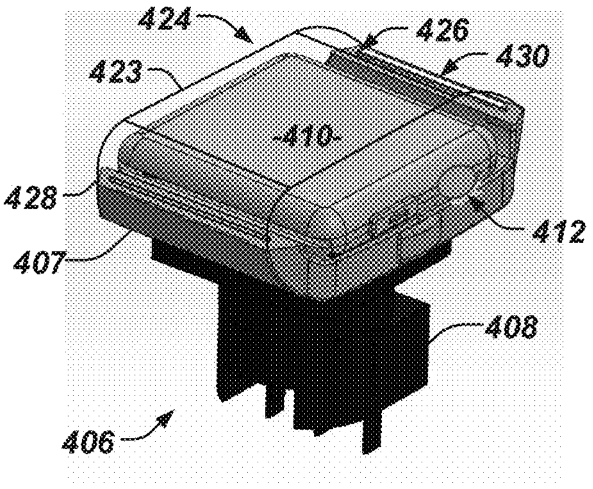
Figure 5D:
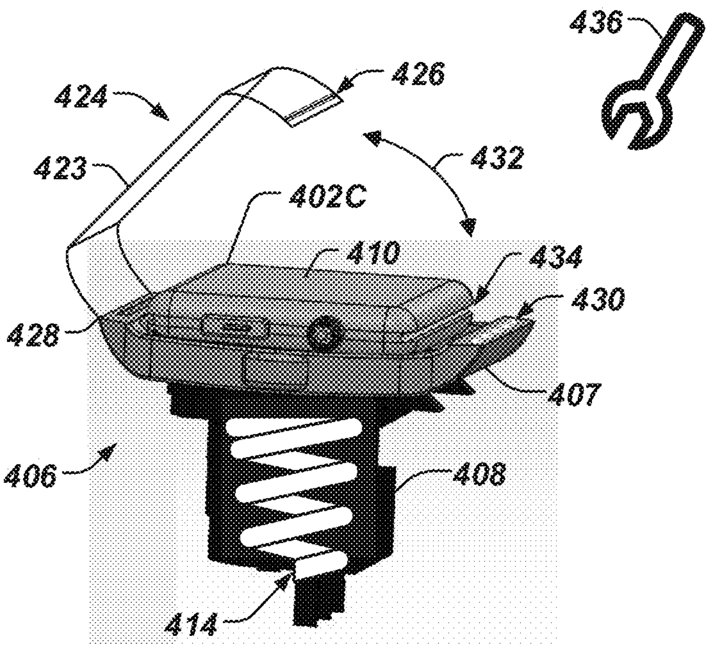

Turning to FIGS. 5C and 5D, in some examples the base 406 includes one or more fasteners or security features to secure or otherwise lock modular buttons in place once inserted into the cradle 407. For instance, the fastener may employ a cover and/or frame 424 configured to overlay all or a portion of the example modular button 402C. The cover 424 may employ one or more of a hinge and/or clasp 428, and may be removable to allow for insertion of the modular button 402C into cradle 407. For instance, the cover 424 may snap into place, thereby fixing and/or otherwise securing the modular button 402C within the cradle 407. In examples, the cover 424 is configured to lock on one or more surface or edges of the base 406, thereby fully or partially enclosing the modular button 402C within the cover 424.

In some examples, the cover 424 includes a cover fastener 426 configured to mate with and/or lock into one or more slots, protrusions, and/or grooves 434 on one or more surfaces of the modular button 402C and/or a cradle fastener 430. The fastener 426 may snap into place, magnetically couple, and/or otherwise releasably connect with the fastener 430. The cover 424 may be a substantially unitary plastic overlay 423, which may allow for touch sensitivity with the touchscreen panel or screen 410 below. In other examples, the cover 424 is a wire frame forming a type of cage around the modular button 402C. The cover 424 may contact the modular button 402C at one or more surfaces.

In some examples, an alternative or additional base fastener is arranged below the modular button 402C, such as within the cradle 407, and configured to mate with a complementary button fastener on the modular button 402C (e.g., opposite the screen 410). For instance, the button fastener may be a protrusion to lock into place with the base fastener. Thus, a given amount of force may release the modular button 402C from the base 406. In some examples, the base and button fasteners are magnetic fasteners. The magnetic fasteners may be electrically powered and employ an electric release, which may be turned on or off in response to an operator instruction (e.g., via a control device, remote control, power control, etc.).

Additionally or alternatively, one or more frame fasteners may be configured to lock in place multiple modular buttons in a single frame (e.g., frame 420). For instance, the secondary fastener may be a rod, a plate, and/or one or more covers and may be arranged to secure one or more modular buttons to the frame. The frame fastener may be arranged to fit over the top of the frame 420, such as overlaid on all or a portion of each modular button (which may include a panel of a gaming system or other surface in which the modular button deck is incorporated). The frame fastener may be arranged beneath the frame to mate with a button fastener once the modular button is inserted into a respective base 406.

In some examples, a tool or service key 436 may be used to unlock or otherwise release the modular button 402C from the base 406. In some examples, the fasteners and/or other security features may require multiple keys to release a modular button. For instance, a combination of physical tools (e.g., a tool 436) and/or electronic tools (e.g., electromagnetic release, electronic activation, password protection, etc.) may be employed to release a modular button from a base.

Figure 6A:
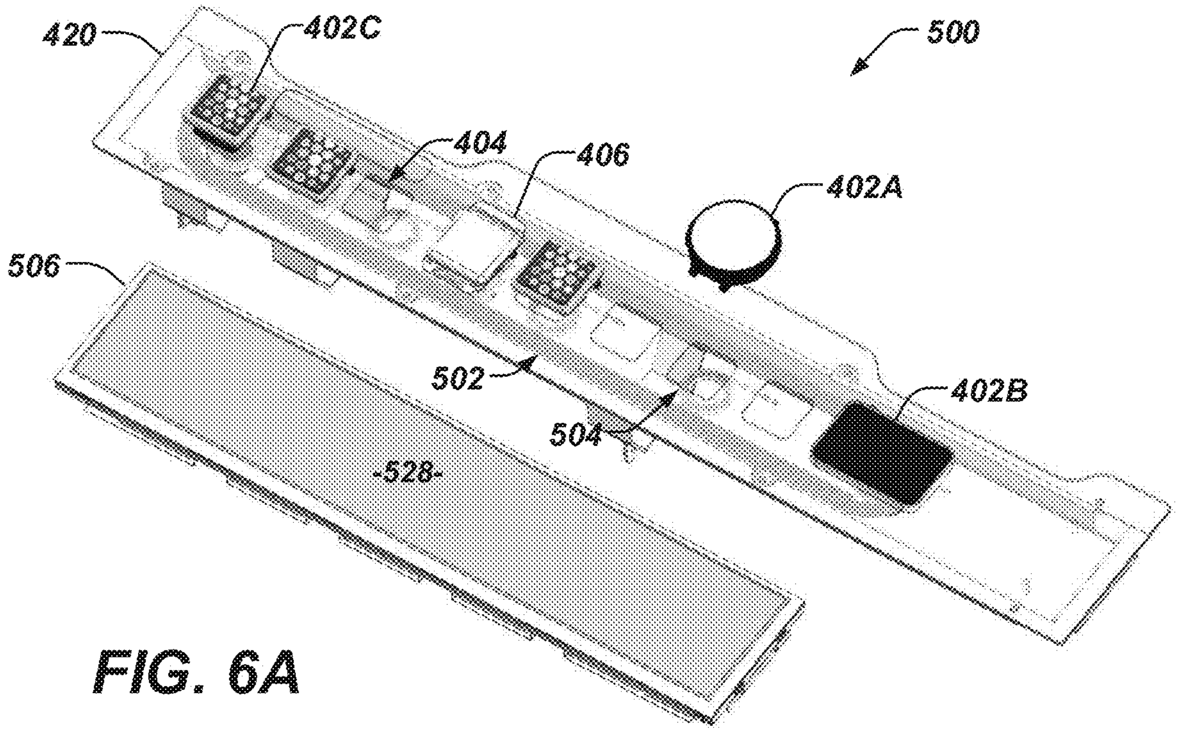
FIGS. 6A to 6C illustrate another example button deck according to some aspects of the present disclosure.

In the example of FIG. 6A, a system 500 includes frame 420 configured to receive and/or secure the modular buttons 402A, 402B and 402C, and an interactive surface display 506 with interactive screen 528. As shown, frame 420 is configured to receive and/or support a wireless power transmission system having devices and/or circuitry 502, 504 to enable wireless transfer of power and/or communications to the modular buttons. For example, the wireless power transmission system (e.g., an inductive power source) is provided within or on the frame to wirelessly transmit power to the modular button. Wireless power transfer (WPT) may be used to transmit electrical energy. In a wireless power transmission system, a transmitter device, driven by electric power from a power source, generates a time-varying electromagnetic field, which transmits power across space to a receiver device, which extracts power from the electromagnetic field and supplies it to an electrical load.

The wireless power transmission system can include a first coil(s) 502 (e.g., to inductively power one or more buttons or displays), and/or a second coil(s) 504. In particular, the second coils 504 may be aligned with an opening 404 to pair with a modular button secured within the frame 420 at a respective opening. Although illustrated as being housed within the frame 420, in some examples inductive coils may be arranged some distance from the modular buttons and/or screen (e.g., within the associated structure), provided the signal strength is sufficient to power the modular buttons and/or screens, and/or to recharge an energy storage device connected to the modular buttons and/or screens. The technology of wireless power transmission can eliminate the use of the wires and batteries, thus increasing the mobility, convenience, and safety of an electronic device for users.

Although described with respect to wireless power transmission, in additional or alternative examples, power and/or communications conductors may connect to the base portion of an individual modular button, transferring power and/or data when secured thereto.

Figure 6B:
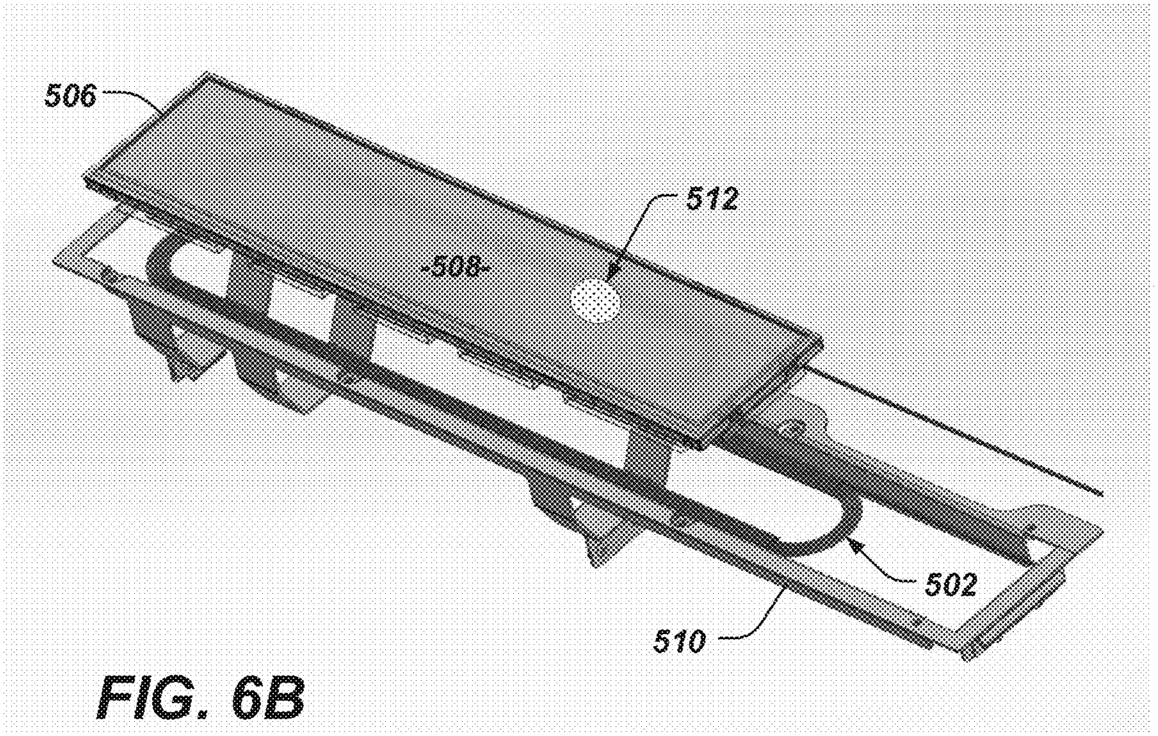

In the example of FIG. 6B, the interactive surface display 506 and/or frame 510 is incorporated in a surface (e.g., a bar top) and operable as a virtual button deck (VBD). The result is a VBD with one or more buttons 512 or other dynamic display, the appearance and/or function of which may be modified for a particular application and/or in response to a player input. The buttons 512 may be arranged in any of a variety of patterns within the interactive surface display 506, which may provide the appearance of the buttons “floating” before the player. For example, the interactive surface display 506 may include a floating bash/play button (e.g., virtual button 512) to control one or more games, displays, or other player responsive content.

In some examples, the interactive surface display 506, screen 528, and/or buttons 512 can be embedded within and/or overlaid with a transparent or semi-transparent media to create a seamless yet waterproof design. Thus, the floating button deck provides a new form of button deck that appears to float before the user, suspended within a transparent or semi-transparent media, such as acrylic, glass or plastic. In some examples, a Projected-capacitive (PCAP) touchscreen technology can be used to allow player interaction with button functions. In some examples, the touch panels are designed to be mounted to the rear surface of a rigid transparent substrate (such as acrylic, glass or plastic) and operated by touching the front surface substrates.

Figure 6C:
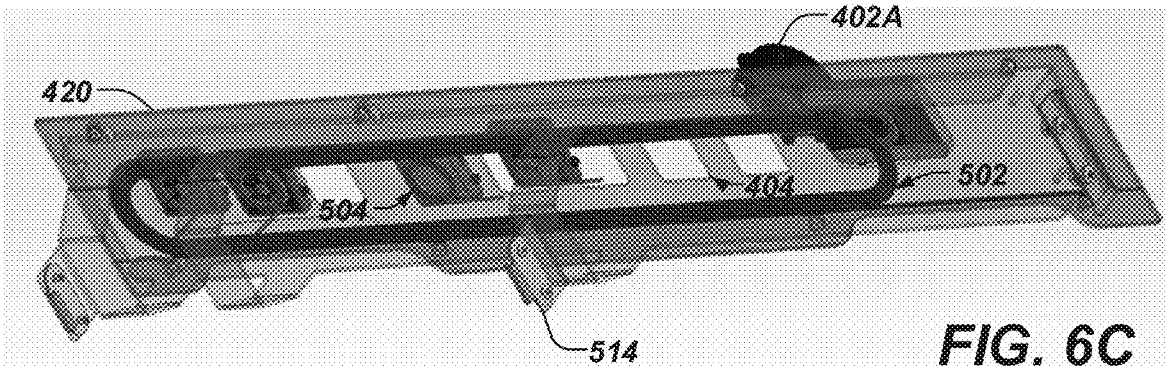

FIG. 6C illustrates an example perspective view of frame 420 from below. As shown, the first, larger coil 502 extends over a greater length of the frame 420, whereas individual coils 504 are dimensioned to focus energy on a single opening 404. As shown in FIG. 6C, one or more brackets 514 may be used to secure the frame 420 to the bar-top, game table, EGM cabinet, paneling, etc.

Figure 7:
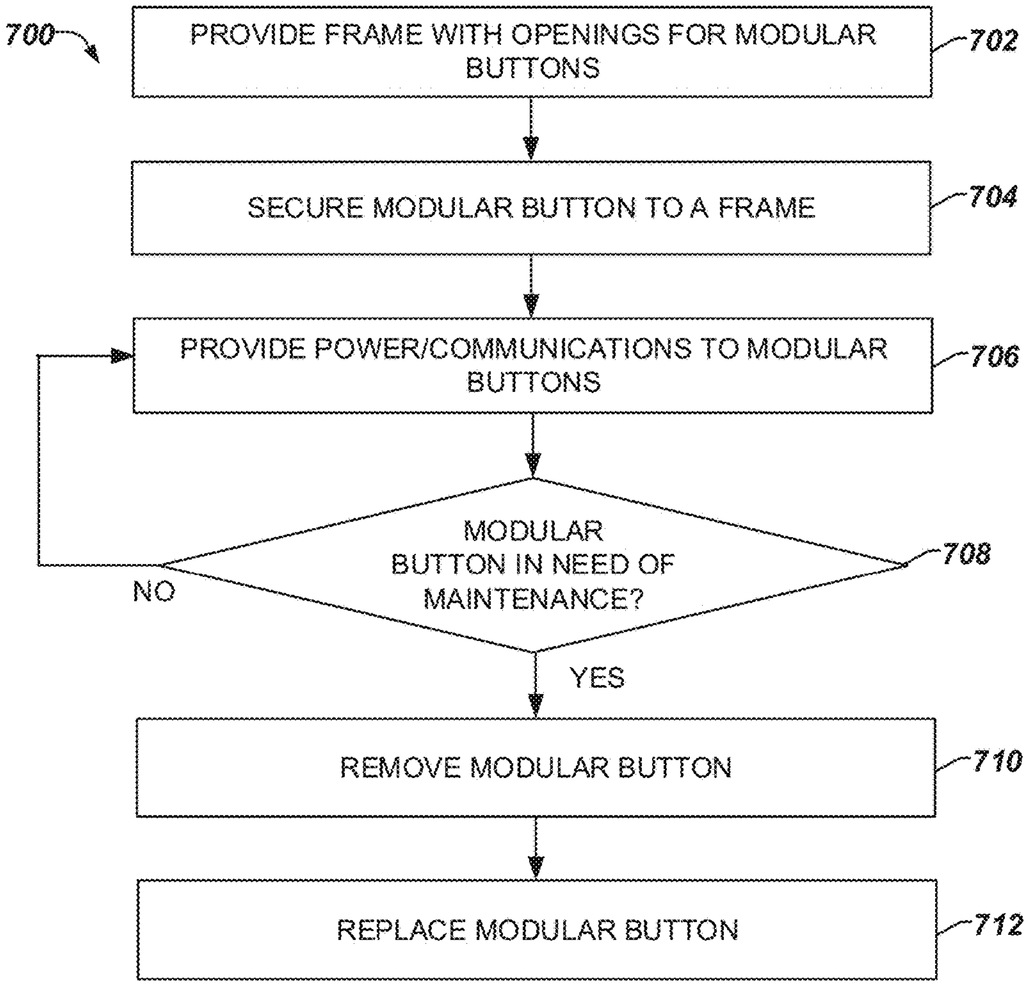
FIG. 7 is an exemplary method for exchanging modular buttons in a button deck according to some aspects of the present disclosure.

FIG. 7 provides a method 700 for exchanging modular buttons in a button deck, as disclosed herein. In block 702, a frame (e.g., frames 420, 510) is provide with openings (e.g., openings 404) for modular buttons (e.g., modular buttons 402A, 402B and 402C). In block 704, modular button is secured to the frame, in accordance with examples provided in this disclosure. In block 706, power and/or communications are optionally provided to the modular buttons. In block 708, it is determined whether a modular button is in need of maintenance or replacement. If maintenance is not needed, the method 700 returns to block 706 to continue use of the modular button within the button deck. If maintenance is needed, the method 700 proceeds to block 710, where the modular button is removed from the frame. In block 712, the modular button is replaced with another suitable modular button, in accordance with examples provided in this disclosure.

In disclosed examples, a button deck includes one or more removable modular buttons that include a dynamic display; and a wireless transceiver; and a frame comprising one or more openings operable to receive the one or more modular buttons.

In some examples, the one or more modular buttons comprises a wireless power system to receive power from a wireless power source. In examples, the one or more modular buttons comprises an energy storage device. In some examples, the dynamic display of the one or more modular buttons comprises a touchscreen panel.

In examples, the one or more modular buttons is mated with a base portion secured to the frame, the base portion operable to releasably secure a single modular button of the one or more modular buttons. In examples, the base portion includes a response feature operable to move part or all of the one or more modular buttons in response to a player action. In examples, the response feature comprises a spring operable to move in response to an applied force from a player. In some examples, the response feature comprises an electromechanical actuator operable to vibrate, depress, extend, or rotate. In some examples, the response feature is operable to move part or all of the one or more modular buttons in response to a game outcome.

In some disclosed examples, multi-button deck for an electronic gaming machine includes a plurality of removable modular buttons, each including a dynamic display; and a wireless transceiver; a plurality of base portions to removably secure the plurality of removable modular buttons; and a frame comprising one or more opening operable to receive the plurality of base portions.

In some examples, the plurality of removable modular buttons comprises first and second modular buttons, the first modular button being a first type of modular button and the second modular button being a second type of modular button different from the first modular button.

In examples, two or more removable modular buttons of the plurality of removable modular buttons are operable to receive control signals from a central control processor to coordinate a display or function of the two or more removable modular buttons.

In some examples, each of the plurality of base portions include a cradle to support a removable modular button of the plurality of removable modular buttons, and a base connector to secure each of the plurality of base portions to the frame. In examples, each of the plurality of base portions further comprise a cover operable to secure a respective removable modular button to each of the plurality of base portions. In examples, each cradle includes a cradle fastener to mate with a cover fastener to secure the cover to a respective base portion.

In some examples, each modular button of the plurality of removable modular buttons includes a button fastener, and each base portion includes a base fastener to mate with and secure the modular button to the base portion. In examples, the button fastener and the base fastener are magnetic fasteners. In some disclosed examples, electronic gaming system including a modular button deck, the modular button deck including a plurality of removable modular buttons, each including a dynamic display; an inductive power receiver; and a wireless transceiver; a plurality of base portions to removably secure the plurality of removable modular buttons; a frame comprising one or more opening operable to receive the plurality of base portions; and a wireless power transmission system mounted within the frame and operable to generate wireless power for the plurality of removable modular buttons.

In some examples, an interactive screen operable to respond to inputs to the plurality of removable modular buttons and receive wireless power from the wireless power transmission system. In examples, the wireless power transmission system includes first coils to generate wireless power for the plurality of removable modular buttons and a second coil to generate wireless power for the interactive screen.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A button deck comprising:

one or more removable modular buttons comprising:

a dynamic display comprising a touchscreen panel; and a wireless transceiver configured to perform wireless communications; and a frame comprising one or more openings operable to receive the one or more modular buttons.

2. The button deck of claim 1, wherein the one or more modular buttons comprises a wireless power system to receive power from a wireless power source.

3. The button deck of claim 1, wherein the one or more modular buttons comprises an energy storage device.

4. The button deck of claim 1, wherein the one or more modular buttons is mated with a base portion secured to the frame, the base portion operable to releasably secure a single modular button of the one or more modular buttons.

5. The button deck of claim 4, wherein the base portion includes a response feature operable to move part or all of the one or more modular buttons in response to a player action.

6. The button deck of claim 5, wherein the response feature comprises a spring operable to move in response to an applied force from a player.

7. The button deck of claim 5, wherein the response feature comprises an electromechanical actuator operable to vibrate, depress, extend, or rotate.

8. The button deck of claim 5, wherein the response feature is operable to move part or all of the one or more modular buttons in response to a game outcome.

9. A multi-button deck for an electronic gaming machine comprising:

a plurality of removable modular buttons, each removable modular button of the plurality of removable modular buttons comprising:

a dynamic display; and a wireless transceiver configured to perform wireless communications;

a plurality of base portions to removably secure the plurality of removable modular buttons, the plurality of base portions comprising base connectors coupled to the plurality of removable modular buttons; and a frame comprising one or more openings operable to receive the plurality of base portions secured by the base connectors to the one or more openings in the frame, wherein each base connector of the plurality of removable modular buttons is configured to be fastened to secure each removable modular button of the plurality of removable modular buttons to the one or more openings of the frame and each base connector of the plurality of removable modular buttons is configured to be unfastened to remove each removable modular button of the plurality of removable modular buttons from the one or more openings of the frame.

10. The multi-button deck of claim 9, wherein the plurality of removable modular buttons comprises first and second modular buttons, the first modular button being a first type of modular button and the second modular button being a second type of modular button different from the first modular button.

11. The multi-button deck of claim 9, wherein two or more removable modular buttons of the plurality of removable modular buttons are operable to receive control signals from a central control processor to coordinate a display or function of the two or more removable modular buttons.

12. The multi-button deck of claim 9, wherein each of the plurality of base portions includes a cradle to support each removable modular button of the plurality of removable modular buttons.

13. The multi-button deck of claim 12, wherein each of the plurality of base portions further comprise a cover operable to secure a respective removable modular button to each of the plurality of base portions.

14. The multi-button deck of claim 13, wherein each cradle includes a cradle fastener to mate with a cover fastener to secure the cover to a respective base portion.

15. The multi-button deck of claim 9, wherein each modular button of the plurality of removable modular buttons includes a button fastener, and each base portion includes a base fastener to mate with and secure the modular button to the base portion.

16. The multi-button deck of claim 15, wherein the button fastener and the base fastener are magnetic fasteners.

17. An electronic gaming system comprising a modular button deck, the modular button deck comprising:

a plurality of removable modular buttons, each removable modular button comprising:

a dynamic display;

an inductive power receiver; and a wireless transceiver;

a plurality of base portions comprising a plurality of base connectors, wherein each base connector of the plurality of base connectors is coupled to each removable modular button to removably secure each removable modular button of the plurality of removable modular buttons;

a frame comprising one or more openings operable to receive the plurality of base portions; and a wireless power transmission system mounted within the frame and operable to generate wireless power for the plurality of removable modular buttons by providing the wireless power to the inductive power receiver of each removable modular button of the plurality of removable modular buttons, wherein each base connector of the plurality of removable modular buttons is configured to be fastened to secure each removable modular button of the plurality of removable modular buttons to the one or more openings of the frame and each base connector of the plurality of removable modular buttons is configured to be unfastened to remove each removable modular button of the plurality of removable modular buttons from the one or more openings of the frame.

18. The electronic gaming system of claim 17, further comprising an interactive screen operable to respond to inputs to the plurality of removable modular buttons and receive the wireless power from the wireless power transmission system.

19. The electronic gaming system of claim 18, wherein the wireless power transmission system includes first coils to generate the wireless power for the plurality of removable modular buttons and a second coil to generate additional wireless power for the interactive screen.

* * * * *